(12) United States Patent
Siotis

(10) Patent No.: US 8,868,413 B2
(45) Date of Patent: Oct. 21, 2014

(54) ACCELEROMETER VECTOR CONTROLLED NOISE CANCELLING METHOD

(75) Inventor: Georg Siotis, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 833 days.

(21) Appl. No.: 13/100,477

(22) Filed: May 4, 2011

(65) Prior Publication Data

US 2012/0259628 A1 Oct. 11, 2012

Related U.S. Application Data

(60) Provisional application No. 61/472,382, filed on Apr. 6, 2011.

(30) Foreign Application Priority Data

Apr. 6, 2011 (EP) .................................... 11161341

(51) Int. Cl.
| | |
|---|---|
| *G10L 21/00* | (2013.01) |
| *G10L 21/02* | (2013.01) |
| *H04R 3/00* | (2006.01) |
| G10L 21/0216 | (2013.01) |
| H04M 1/03 | (2006.01) |

(52) U.S. Cl.
CPC ........... *H04R 3/005* (2013.01); *H04M 2250/12* (2013.01); *H04R 2410/07* (2013.01); *H04R 2499/11* (2013.01); *G10L 2021/02166* (2013.01); *H04M 1/03* (2013.01)
USPC .......................................... 704/225; 704/226

(58) Field of Classification Search
CPC . G10L 21/02; G10L 21/0316; G10L 21/0332; H04R 3/005; H04R 2430/20; H04R 2203/12; H04R 2499/11

USPC ................................................... 704/225, 226
See application file for complete search history.

(56) References Cited

U.S. PATENT DOCUMENTS

| | | | | |
|---|---|---|---|---|
| 5,353,376 A | * | 10/1994 | Oh et al. ........................ | 704/233 |
| 5,757,937 A | * | 5/1998 | Itoh et al. ..................... | 381/94.3 |
| 6,265,264 B1 | * | 7/2001 | An et al. ...................... | 438/255 |

(Continued)

OTHER PUBLICATIONS

Extended European Search Report of corresponding European Patent Application No. 11161341.0, dated Sep. 2, 2011.

*Primary Examiner* — Eric Yen
(74) *Attorney, Agent, or Firm* — Renner, Otto, Boisselle & Sklar, LLP

(57) ABSTRACT

A telecommunication device is disclosed, comprising: a microphone array comprising a plurality of microphones, wherein each microphone receives an analogue acoustic signal; a position sensing device for determining how the telecommunication device is positioned in three-dimensions with respect to a user's mouth; at least one analogue/digital converter for converting each analogue acoustic signal into a digital signal; a digital signal processor for performing signal processing on the received digital signals comprising a controller, a plurality of delay circuits for delaying each received signal based on an input from the controller and a plurality of preamplifiers for adjusting the gain of each received signal based on a gain input from the controller, wherein the controller selects the appropriate delay and gain values applied to each received signal to remove noise from the received signals based on the determined position of the telecommunication device. A method for creating and controlling a location of a virtual microphone near a telecommunication device so as to reduce background noise in a speech signal is also disclosed.

21 Claims, 6 Drawing Sheets

(56) References Cited

U.S. PATENT DOCUMENTS

| | | | |
|---|---|---|---|
| 6,411,927 B1* | 6/2002 | Morin et al. | 704/224 |
| 6,469,732 B1* | 10/2002 | Chang et al. | 348/14.08 |
| 6,738,481 B2* | 5/2004 | Krasny et al. | 381/94.1 |
| 6,879,952 B2* | 4/2005 | Acero et al. | 704/222 |
| 7,720,683 B1* | 5/2010 | Vermeulen et al. | 704/254 |
| 8,249,862 B1* | 8/2012 | Cheng et al. | 704/205 |
| 2002/0071573 A1* | 6/2002 | Finn | 381/93 |
| 2002/0161577 A1* | 10/2002 | Smith | 704/233 |
| 2002/0176589 A1* | 11/2002 | Buck et al. | 381/94.7 |
| 2003/0185410 A1* | 10/2003 | June et al. | 381/94.1 |
| 2004/0040621 A1* | 3/2004 | Gotanda et al. | 141/330 |
| 2004/0066941 A1* | 4/2004 | Amada et al. | 381/98 |
| 2004/0221163 A1* | 11/2004 | Jorgensen et al. | 713/182 |
| 2005/0080616 A1* | 4/2005 | Leung et al. | 704/200.1 |
| 2005/0185813 A1* | 8/2005 | Sinclair et al. | 381/380 |
| 2005/0254664 A1* | 11/2005 | Kwong et al. | 381/71.2 |
| 2007/0230712 A1 | 10/2007 | Belt et al. | |
| 2008/0298602 A1* | 12/2008 | Wolff et al. | 381/66 |
| 2009/0003626 A1 | 1/2009 | Burnett | |
| 2009/0010449 A1* | 1/2009 | Burnett | 381/92 |
| 2009/0129609 A1* | 5/2009 | Oh et al. | 381/92 |
| 2009/0144063 A1* | 6/2009 | Beack et al. | 704/500 |
| 2009/0179914 A1* | 7/2009 | Dahlke | 345/619 |
| 2009/0210227 A1* | 8/2009 | Sugiyama et al. | 704/246 |
| 2010/0017205 A1* | 1/2010 | Visser et al. | 704/225 |
| 2010/0081487 A1 | 4/2010 | Chen et al. | |
| 2011/0075859 A1* | 3/2011 | Kim et al. | 381/92 |
| 2011/0158425 A1* | 6/2011 | Hayakawa | 381/92 |

* cited by examiner

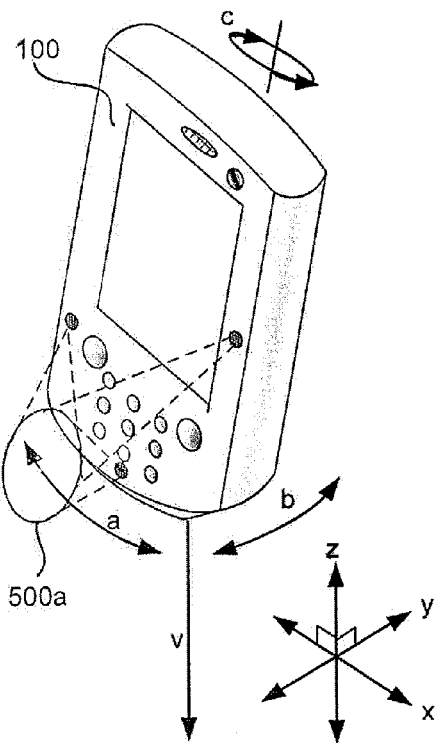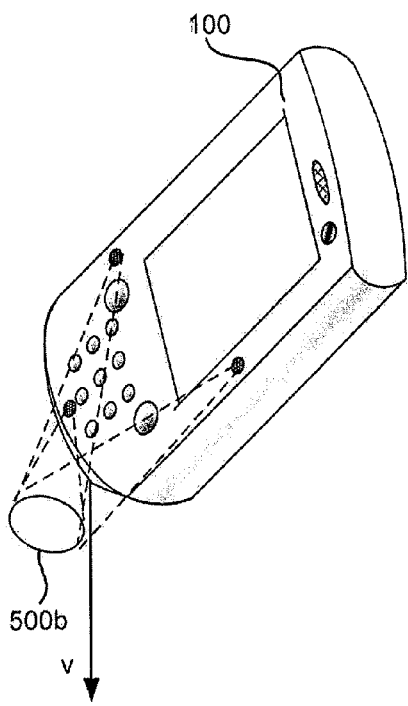
Fig. 5A  Fig. 5B
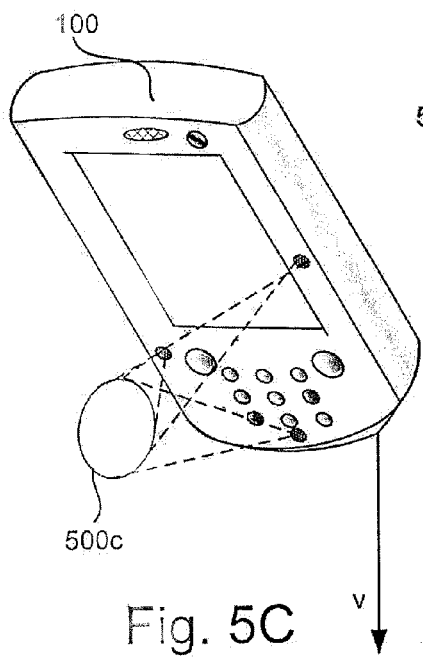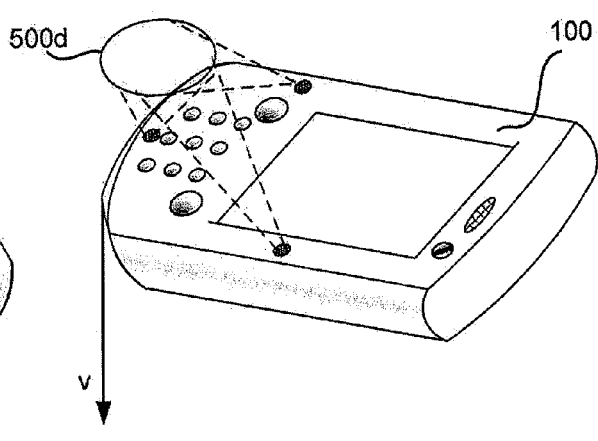
Fig. 5C  Fig. 5D

ACCELEROMETER VECTOR CONTROLLED NOISE CANCELLING METHOD

RELATED APPLICATION DATA

This application claims the benefit of U.S. Provisional Patent Application No. 61/472,382, filed Apr. 6, 2011, the disclosure of which is incorporated herein by reference in its entirety, and claims the benefit of European Patent Application No. 11161341.0, filed Apr. 6, 2011, the disclosure of which is incorporated herein by reference in its entirety.

TECHNICAL FIELD

The present invention generally relates to generating uplink noise cancellation in a telecommunication device. In particular, the present invention relates to a method and apparatus for changing the location of a sensitivity lobe of a microphone array based on how the telecommunication device is being held.

BACKGROUND

The use of wireless or telecommunication devices such as a cellular phone has greatly increased through the years. As a result, these telecommunication devices are being used in a large variety of environments ranging from inside moving vehicles, to crowded cafes, to windy beaches. Many of these environments are noisy environments which pose special problems for service providers to provide acceptable signal quality to their users.

For many conventional telecommunication devices, a microphone is placed near a speaking user's mouth and will pick up speech signals. Unfortunately, the microphone will also pick up background noise, which can greatly degrade the quality of the speech signal transmitted to all of the parties involved in the call. Many noise cancellation methods have been developed for single microphone systems, but they tend to still result in substandard quality when used in noisy conditions.

Better noise cancellation can be achieved using multiple microphones located on the telecommunication device. The multiple microphone techniques exploit spatial selectivity and can suppress non-stationary noises such as babbling noise produced by people talking in the background. However, many of these systems still assume a standard location of the microphones in relation to the speaker's mouth. A problem occurs when the speaker does not hold the communication device in the standard configuration.

One system designed to overcome such problems is disclosed in U.S. patent application No. 2007/0230712. In this system, two microphones are used to capture an acoustic signal including the desired voice signal and an unwanted noise signal. The telecommunication device includes an orientation sensor for measuring a one dimensional orientation of the communication device, i.e., how the telecommunication device is being held along the user's cheek, while the acoustic signal is being captured. An audio processing unit then processes the acoustic signal to remove some of the noise based on the measured orientation of the telecommunication device.

One problem with the disclosed multiple microphone technique is that the noise cancellation system relies only on the one dimensional orientation measurement along the cheek of the user. Unfortunately, different users hold their telecommunication devices in a variety of ways, which results on various distances between the user's mouth and the telecommunication device and distances between the user's ear and the telecommunication device. Thus, there is a need for a method and apparatus for providing noise cancellation in a received acoustic signal based on a three dimensional orientation measurement of the telecommunication device.

SUMMARY

The present invention provides noise cancellation for acoustic signals received by a plurality of microphones wherein the three-dimensional position of the telecommunication device is determined and then used by a digital signal processor to remove the noise component from the acoustic signal.

According to a first aspect, there is provided a telecommunication device, comprising: a microphone array comprising a plurality of microphones, wherein each microphone receives an analogue acoustic signal; a position sensing device for determining how the telecommunication device is positioned in three-dimensions with respect to a user's mouth; at least one analogue/digital converter for converting each analogue acoustic signal into a digital signal; a digital signal processor for performing signal processing on the received digital signals comprising a controller, a plurality of delay circuits for delaying each received signal based on an input from the controller and a plurality of preamplifiers for adjusting the gain of each received signal based on a gain input from the controller, wherein the controller selects the appropriate delay and gain values applied to each received signal to remove noise from the received signals based on the determined position of the telecommunication device.

According to second aspect, there is provided a method for creating and controlling a location of a virtual microphone near a telecommunication device so as to reduce background noise in a speech signal, comprising the steps of: receiving acoustic signals containing a speech signal and a noise signal at a plurality of microphones located on the telecommunication device; determining a three-dimensional position of the telecommunication device with reference to a user's mouth; and adjusting delay and gain values applied to the received acoustic signals from each microphone based on the determined position of the telecommunication device to reduce the noise signal in the received acoustic signal.

According to a third aspect, there is provide a computer program comprising instructions which when executed on a processor of a telecommunication device cause the telecommunication device to perform the method according to the second aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

FIG. 5A illustrates a telecommunication device being held in a first position according to one embodiment of the invention.

FIG. 5B illustrates a telecommunication device being held in a second position according to one embodiment of the invention.

FIG. 5C illustrates a telecommunication device being held in a third position according to one embodiment of the invention.

FIG. 5D illustrates a telecommunication device being held in a fourth position according to one embodiment of the invention.

DETAILED DESCRIPTION OF PREFERRED EMBODIMENTS

Figure 1:
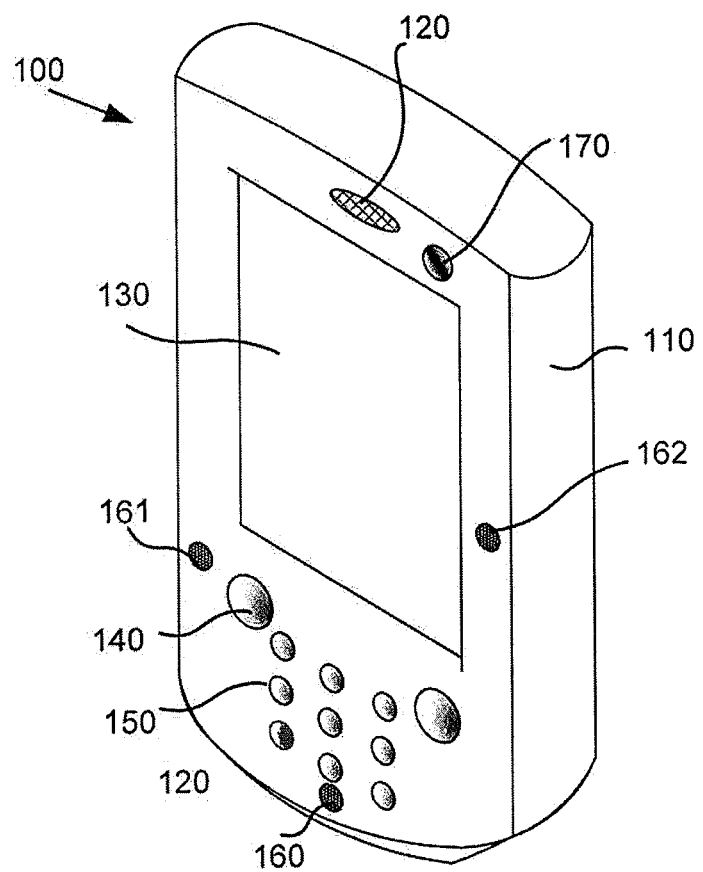
FIG. 1 schematically illustrates a telecommunication device according to one embodiment of the invention.

FIG. 1 is a diagram of a telecommunication device 100 according to an implementation consistent with principles of the invention. As shown in FIG. 1 the telecommunication device 100 may include a housing 110, a speaker 120, a display 130, control buttons 140, a keypad 150, a plurality of microphones 160, 161, 162, and an imaging unit 170. The housing 110 may support the components of the telecommunication device 100. The speaker 120 may provide audible information to the user of the telecommunication device 100. The display 130 may provide visual information to a user of the telecommunication device 100. For example, the display 130 may render media information, such as image frames and/or video, and/or function as a viewfinder in connection with the operation of the imaging unit 170. The control buttons 140 may permit the user to interact with the communication device 100 to cause the telecommunication device 100 to perform one or more operations. The keypad 150 may include a standard telephone keypad. The microphones 160, 161, 162 can be unidirectional microphones and arranged in an array which creates a virtual microphone which receives audible information from the user. As will be explained below in more detail the location of the virtual microphone can be changed by adjusting the delay and gain of the acoustic signals captured by the plurality of microphones. The microphones can be arranged symmetrically or asymmetrically around the telecommunication device 100. Furthermore, the location of each microphone on the communication device 100 and the number of microphones used in the array can be varied from the layout shown in FIG. 1 and the invention is not limited thereto. The imaging unit 170 may enable the user to capture and store video and/or images.

Figure 2:
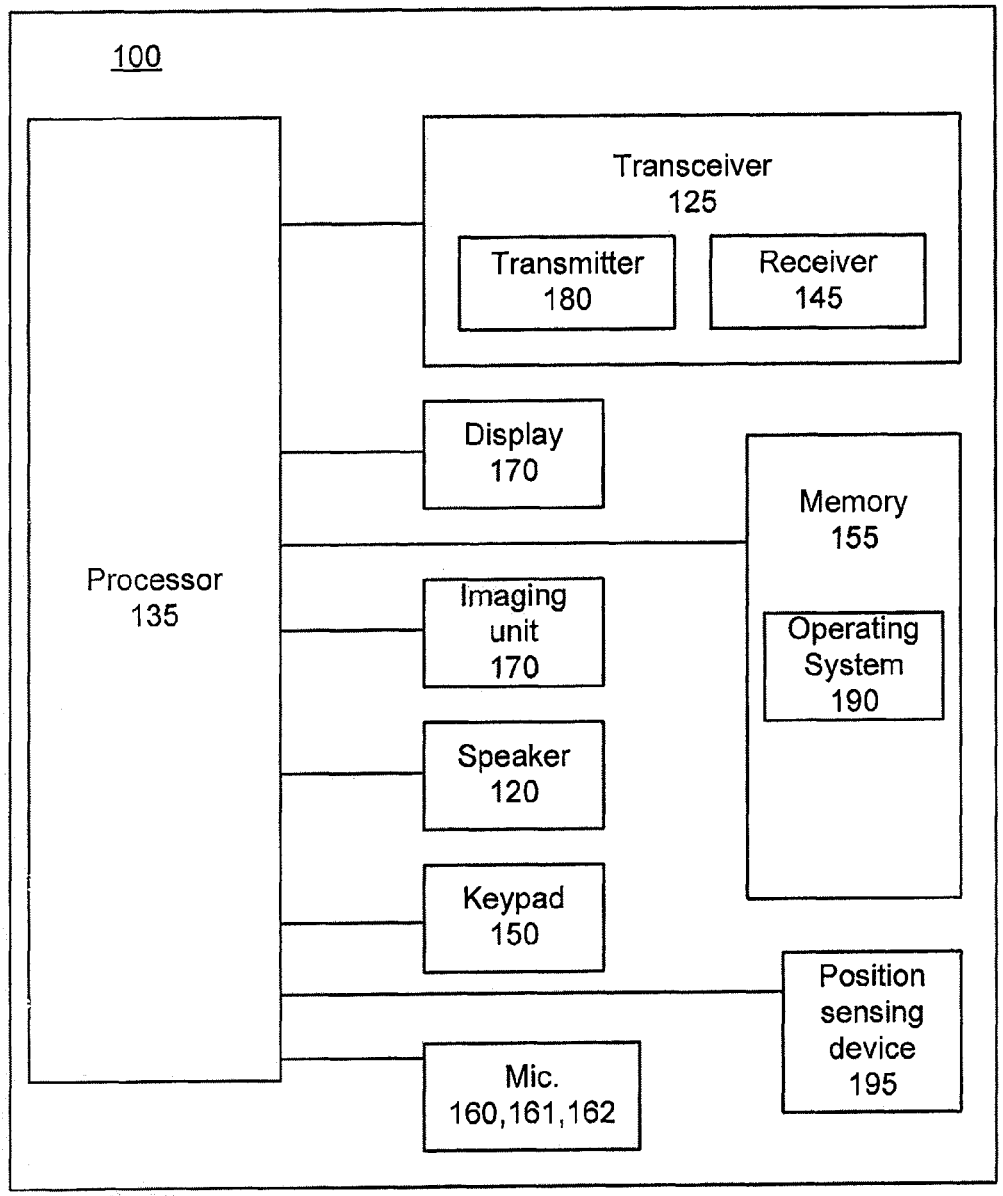
FIG. 2 illustrates further features of the telecommunication device illustrated in FIG. 1 according to one embodiment of the invention.

Referring now to FIG. 2, an exemplary telecommunication device 100, in accordance with one embodiment of the invention, comprises a microphone array comprised of three microphones 160, 161, 162, a keypad 150, one or more speakers 120, the display 130, a transceiver 125, a memory 155 that communicates with a processor 135, an imaging unit 170 and an position sensing device 195. The transceiver 125 comprises a transmitter circuit 180 and a receiver circuit 145, which respectively transmit outgoing radio frequency signals to base station transceivers and receive incoming radio frequency signals from the base station transceivers via an antenna 115.

The processor 135 communicates with the memory 155 via an address/data bus. The processor 135 may be, for example, a commercially available or custom microprocessor. The memory 155 is representative of the one or more memory devices containing software and data used to provide audible feedback to a user through the speaker 120. The memory 155 may include, but is not limited to, the following types of devices: cache, ROM, PROM, EPROM, EEPROM, flash, SRAM and DRAM.

The memory 155 may contain various categories of software and/or data. For example, as illustrated in FIG. 2, the memory 155 may comprise an operating system 190. The operating system 190 generally controls the operation of the telecommunication device 100. In particular, the operating system 190 may manage the telecommunication device's software and/or hardware resources and may coordinate execution of programs by the processor 135. Although FIG. 2 illustrates an exemplary software and hardware architecture that may be used to provide noise cancellation and other operations of a telecommunication device, it will be understood that the present invention is not limited to such a configuration but is intended to encompass any configuration capable of carrying out the operations described herein.

Figure 3:
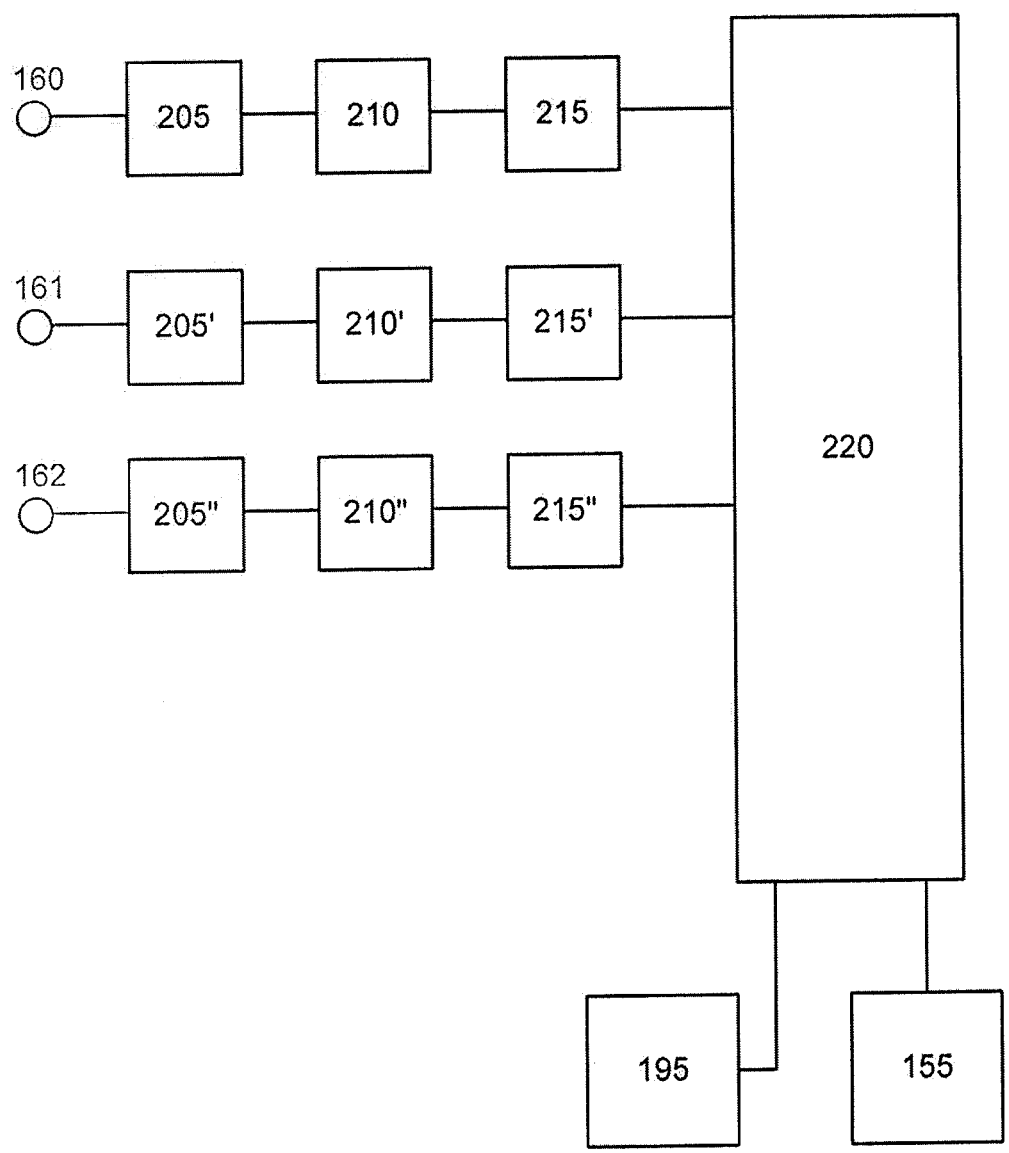
FIG. 3 illustrates a microphone array with signal processing devices according to one embodiment of the invention.

According to one embodiment of the invention, the processor 135 may be comprised of or operate like various components comprising but not limited thereto at least Digital Signal Processor (DSP) hardware including one analogue/digital converter 205, 205', 205", at least one delay element 210, 210', 210" and at least one preamplifier 215, 215', 215" and the controller 220 as illustrated in FIG. 3. In this embodiment, each microphone has its own A/D converter, delay element and preamplifier but the invention is not limited thereto. The controller 220 can control the microphone array comprised of microphones 160, 161, 162 by adjusting the delay and gain values that are applied to the acoustic signals received by each microphone.

As mentioned above, the microphone array creates a virtual microphone using known control techniques. The virtual microphone has sensitivity lobes from which acoustic signals are received and null sections from which no or limited acoustic signal are received or dampened. The location of the virtual microphone can be moved by adjusting the delay, gain, and frequency response values applied to the received signals. Thus, the best location for recording speech signals can be moved around the telecommunication device 100 by adjusting the delay and gain values applied during processing.

According to one embodiment of the invention, a position sensing device 195 is incorporated into the telecommunication device 100. The position sensing device 195 is used to determine how the user is holding the telecommunication device 100 in relation to the user's head. In this embodiment of the invention, the position sensing device is an accelerometer but the invention is not limited thereto. For example, any device which can sense or determine how the telecommunication device is being held in a three-dimensional way can be used in the present invention. In this embodiment, the accelerometer 195 can create an [x,y,z] system, wherein the three sub-vectors are orthogonal in relation to each other, and the resulting vector v determined by the accelerometer 195 always points to the ground.

As a result of the position information obtained from the accelerometer 195, the controller 220 can determine the location of the virtual microphone to be able to receive acoustic signals in an approximate direction of the user's mouth. The controller 220 can then change the location of the virtual microphone to correspond to the determined position of the user's mouth. This will increase the speech component in the processed acoustic signal while decreasing the noise component, thus increasing the quality of the speech component.

According to one embodiment of the invention, the controller 220 can store various delay, gain, and frequency shape values for various predetermined positions of the telecommunication device. As a result, the controller 220 can quickly apply the appropriate delay and gain values to the acoustic signals from the microphone array once the position of the telecommunication device is determined. The user may turn the device 100 in different directions illustrated, but not limited to, the arrows a, b, and c as shown in FIG. 5A.

For example, a first set of delay and gain values can be stored for use when the telecommunication device is being held in a standard manner as illustrated in FIG. 5A, The location of the virtual microphone can be moved by adjusting the delay, gain, and frequency response values applied to the received signals. Thus, the best location for recording speech signals can be moved in a direction illustrated by the dashed lines and oval forming a virtual microphone lobe 500a of a virtual microphone.

A second set of delay and gain values can be stored to be used when the telecommunication device is being held in the manner illustrated in FIG. 5B. In this example, the stored values would move the location of the virtual microphone down, forming a virtual microphone lobe 500b, since the telecommunication device is being held above the user's mouth.

A third set of delay and gain values can be stored to be used when the telecommunication device is being held in the manner illustrated in FIG. 5C. In this example, the stored values would move the location of the virtual microphone in a direction from the telecommunication device forming a virtual microphone lobe 500c, since the telecommunication device is being held above and away from the user's mouth.

A fourth set of delay and gain values can be stored to be used when the telecommunication device is being held in the manner illustrated in FIG. 5D. In this example, the stored values would move the location of the virtual microphone up forming a virtual microphone lobe 500d since the user most likely be lying and thus the telecommunication device is being held in a standard matter in relation to the user's mouth. The decision to form a virtual microphone lobe in a direction illustrated in FIG. 5D may be based on a reasonableness analysis performed by the controller based on the position information received from the accelerometer 195 about the device 100.

This change of direction of the virtual microphone, as illustrated in FIG. 5D, may be delayed, because the device 100 may just be temporary moved into this position and than back to a normal position where the user sits or stands. In this case the virtual microphone lobe will be directed according to the location illustrated in FIG. 5A.

Figure 4:
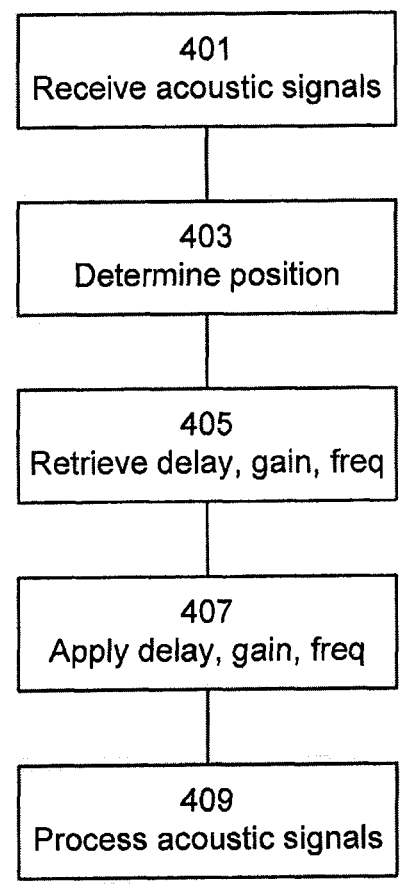
FIG. 4 is a flow chart illustrating a method for noise cancellation according to one embodiment of the invention.

The operation of the processor 135 will now be described with reference to FIG. 4 according to one embodiment of the invention. In step 401, each microphone of the microphone array receives a plurality of acoustic signals. In step 403, the controller 220 receives information from the accelerometer 195 to determine the position of the telecommunication device in relation to the user's head. The controller 220 either calculates the needed delay and gain values for each received acoustic signal or simply retrieves stored delay and gain values from memory 155 for the determined position of the telecommunication device 100 in step 405. The controller 220 then applies the selected delay and gain values to the delay elements 210 and the preamplifiers 215 in step 407. The controller then processes the acoustic signals in a known manner using the applied delay and gain values after they have been converted into digital signals by the A/D converters 205 to produce an output signal in step 409. The output signals can then be sent to the transceiver 180 for broadcast.

According to another embodiment of the invention, the controller 220 sends the output signals as a side tone to the ear speaker 120 of the telecommunication device 100 so that the user can hear his/her part of the conversation. In this embodiment, the controller 220 can adjust the strength of the side tone based on the determined position of the telecommunication device. For example, the strength of the side tone can be increased when it is determined that the telecommunication device is being held away from the user's ear.

The method according to the present invention is suitable for implementation with aid of processing means, such as computers and/or processors. Further especially, the feature of processing digital signals are particularly suitable to be performed in a Digital Signal Processor (DSP) hardware or other dedicated hardware.

Figure 6:
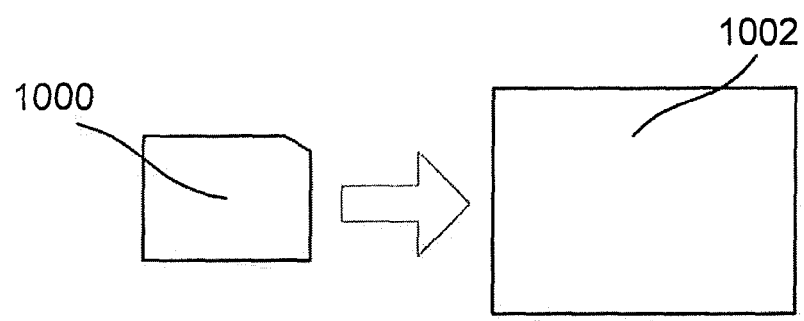
FIG. 6 schematically illustrates a computer readable medium and a processing device, wherein a computer program is stored on the computer readable medium, the computer program comprising instructions which when executed on the processor of a telecommunication device cause the method of FIG. 4.

Therefore, there is provided computer programs, comprising instructions arranged to cause the processing means, processor, or computer to perform the steps of any of the methods according to any of the embodiments described with reference to FIG. 4. The computer programs preferably comprise program code which is stored on a computer readable medium 1000, as illustrated in FIG. 6, which can be loaded and executed by a processing means, processor, or computer 1002 to cause it to perform the methods, respectively, according to embodiments of the present invention, preferably as any of the embodiments described with reference to FIG. 4. The computer 1002 and computer program product 1000 can be arranged to execute the program code sequentially where actions of the any of the methods are performed stepwise. The processing means, processor, or computer 1002 is preferably what normally is referred to as an embedded system. Thus, the depicted computer readable medium 1000 and computer 1002 in FIG. 6 should be construed to be for illustrative purposes only to provide understanding of the principle, and not to be construed as any direct illustration of the elements.

The invention has mainly been described above with reference to a few embodiments. However, as is readily appreciated by a person skilled in the art, other embodiments than the ones disclosed above are equally possible within the scope of the invention, as defined by the appended patent claims.

For example, the microphone array may be comprised of at least three or more microphones in other embodiments.

The invention claimed is:
1. A telecommunication device, comprising:
a microphone array comprising a plurality of microphones, wherein each microphone receives an analogue acoustic signal;
a position sensing device that determines how the telecommunication device is positioned in three-dimensions with respect to a user's mouth, wherein the position sensing device is an accelerometer and the accelerometer expresses the determined position as an output hav- ing three sub-vectors orthogonal in relation to each other, and a vector resulting from the sub-vectors pointing to the ground;

at least one analogue/digital converter that converts an output of each microphone into a respective digital signal;

a digital signal processor that performs signal processing on the digital signals to remove noise from the digital signals, the digital signal processor comprising:
a controller,
a plurality of delay circuits, each delay circuit delaying a respective one of the digital signals in accordance with a respective delay value from the controller, and
a plurality of preamplifiers, each preamplifier adjusting gain and frequency response of a respective one of the digital signals in accordance with a respective gain value and a respective frequency response value from the controller,
wherein the controller selects each delay, gain, and frequency response value based on the determined position of the telecommunication device.

2. The telecommunication device according to claim 1, wherein each microphone is a unidirectional microphone.

3. The telecommunication device according to claim 1, wherein the selected gain and delay values, when applied to the digital signals via the delay circuits and the preamplifiers, create a virtual microphone located near the telecommunication device.

4. The telecommunication device according to claim 3, wherein the controller moves the location of the virtual microphone near the telecommunication device to various locations by changing the selected delay and gain values.

5. The telecommunication device according to claim 4, wherein the controller is adapted to delay the movement of the location of the virtual microphone.

6. The telecommunication device according to claim 4, wherein the controller moves the location of the virtual microphone in response to a reasonableness analysis, the reasonable analysis performed by the controller based on the position determined by the accelerometer.

7. The telecommunication device according to claim 4, wherein a predetermined gain value for each preamplifier and a predetermined delay value for each delay circuit are stored in a memory for each of plural predetermined positions of the telecommunication device.

8. The telecommunication device according to claim 1, further comprising an ear speaker, wherein the controller sends a side tone signal to the ear speaker, the side tone signal adjusted by the controller based on the determined position of the telecommunication device.

9. The telecommunication device according to claim 8, wherein the selected gain and delay values, when applied to the digital signals via the delay circuits and the preamplifiers, create a virtual microphone located near the telecommunication device and the controller increases the side tone signal as a function of increasing distance between the virtual microphone and the user's mouth.

10. The telecommunication device according to claim 1, wherein the microphone array comprises at least three microphones.

11. The telecommunication device according to claim 10, wherein the at least three microphones are arranged asymmetrically around the telecommunication device.

12. A method for creating and controlling a location of a virtual microphone near a telecommunication device so as to reduce background noise in an acoustic signal containing speech and the background noise, comprising the steps of:

receiving the acoustic signal containing the speech and the background noise at each of a plurality of microphones that are located on the telecommunication device, each microphone outputting a respective signal;

determining, with a position sensing device of the telecommunication device, a three-dimensional position of the telecommunication device with reference to a user's mouth, wherein the position sensing device is an accelerometer and the accelerometer creates a three-dimensional vector that expresses the determined position, wherein a first axis of the three-dimensional vector corresponds to position along a user's cheek, a second axis of the three-dimensional vector corresponds to position away from the user's cheek, and a third axis of the three-dimensional vector corresponds to position relative to the user's ear; and adjusting, with signal processing hardware, delay and gain of each signal output by the microphones, an amount of each delay and an amount of each gain are based on the determined position of the telecommunication device.

13. The method according to claim 12, further comprising adjusting frequency response of each signal output by the microphones, wherein the amount of gain, the amount of delay, and the frequency response adjustment applied to each of the signals output by the microphones create a virtual microphone located near the telecommunication device.

14. The method according to claim 13, wherein the location of the virtual microphone near the telecommunication device is moved to various locations by changing the amount of delay, the amount of gain, and the frequency response adjustment.

15. The method according to claim 14, wherein a predetermined gain amount, a predetermined delay amount, and a predetermined frequency response adjustment for each signal output by the microphones are stored in a memory for each of plural predetermined positions of the telecommunication device.

16. The method according to claim 13, further comprising the step of:
sending a side tone signal to an ear speaker of the telecommunication device, wherein a strength of the side tone signal is adjusted based on the determined position of the telecommunication device.

17. The method according to claim 16, wherein the side tone signal is increased as a function of increasing distance between the virtual microphone and the user's mouth.

18. The telecommunication device according to claim 14, wherein the movement of the location of the virtual microphone is delayed.

19. The telecommunication device according to claim 14, wherein the location of the virtual microphone is moved in response to a reasonableness analysis, the reasonable analysis based on position information received from the accelerometer.

20. A telecommunication device, comprising:
a microphone array comprising a plurality of microphones, wherein each microphone receives an analogue acoustic signal;
a position sensing device that determines how the telecommunication device is positioned in three-dimensions with respect to a user's mouth, wherein the position sensing device is an accelerometer and the accelerometer creates a three-dimensional vector that expresses the determined position, wherein a first axis of the three-dimensional vector corresponds to position along a user's cheek, a second axis of the three-dimensional vector corresponds to position away from the user's cheek, and a third axis of the three-dimensional vector corresponds to position relative to the user's ear;

at least one analogue/digital converter that converts an output of each microphone into a respective digital signal;

a digital signal processor that performs signal processing on the digital signals to remove noise from the digital signals, the digital signal processor comprising:

a controller, a plurality of delay circuits, each delay circuit delaying a respective one of the digital signals in accordance with a respective delay value from the controller, and a plurality of preamplifiers, each preamplifier adjusting gain of a respective one of the digital signals in accordance with a respective gain value from the controller, wherein the controller selects each delay and gain value based on the determined position of the telecommunication device.

21. A method for creating and controlling a location of a virtual microphone near a telecommunication device so as to reduce background noise in an acoustic signal containing speech and the background noise, comprising the steps of:

receiving the acoustic signal containing the speech and the background noise at each of a plurality of microphones that are located on the telecommunication device, each microphone outputting a respective signal;

determining, with a position sensing device of the telecommunication device, a three-dimensional position of the telecommunication device with reference to a user's mouth, wherein the position sensing device is an accelerometer and the accelerometer expresses the determined position as an output having three sub-vectors orthogonal in relation to each other, and a vector resulting from the sub-vectors pointing to the ground; and adjusting, with signal processing hardware, delay and gain of each signal output by the microphones, an amount of each delay and an amount of each gain are based on the determined position of the telecommunication device.

* * * * *